(12) United States Patent
Kobayashi et al.

(10) Patent No.: US 10,655,241 B2
(45) Date of Patent: May 19, 2020

(54) ELECTRODE FOIL PRODUCTION METHOD AND CAPACITOR PRODUCTION METHOD

(71) Applicant: Panasonic Intellectual Property Management Co., Ltd., Osaka (JP)

(72) Inventors: Kyohei Kobayashi, Hyogo (JP); Yukiyasu Sugihara, Kyoto (JP); Hiroshi Yoshida, Kyoto (JP); Mitsuhisa Yoshimura, Osaka (JP); Hiromi Nakanishi, Kyoto (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 52 days.

(21) Appl. No.: 15/980,132

(22) Filed: May 15, 2018

(65) Prior Publication Data

US 2018/0258548 A1 Sep. 13, 2018

Related U.S. Application Data

(63) Continuation of application No. PCT/JP2016/004722, filed on Oct. 27, 2016.

(30) Foreign Application Priority Data

Nov. 30, 2015 (JP) .................................. 2015-234228

(51) Int. Cl.
*C25F 3/14* (2006.01)
*H01G 9/04* (2006.01)
(Continued)

(52) U.S. Cl.
CPC ............. *C25F 3/14* (2013.01); *H01G 9/0032* (2013.01); *H01G 9/04* (2013.01); *H01G 9/042* (2013.01);
(Continued)

(58) Field of Classification Search
CPC ........................................................ C25F 3/14
See application file for complete search history.

(56) References Cited

U.S. PATENT DOCUMENTS 9,365,947 B2 * 6/2016 Uzoh .................... H05K 1/0212
2009/0212013 A1 8/2009 Imanaka et al.
(Continued)

FOREIGN PATENT DOCUMENTS

| CN | 101552140 A | 10/2009 |
|---|---|---|
| CN | 105612275 A | 5/2016 |
| JP | 5333582 B | 11/2013 |

OTHER PUBLICATIONS

English Translation of Chinese Search Report dated Mar. 11, 2019 for the related Chinese Patent Application No. 201680068470.9.
(Continued)

*Primary Examiner* — Nicholas A Smith
(74) *Attorney, Agent, or Firm* — McDermott Will & Emery LLP

(57) ABSTRACT

A method for producing an electrode foil includes an electrolytic etching step of etching a metal foil containing first metal by applying current between the metal foil and an electrode in etching liquid while a principal surface of the metal foil faces the electrode. A masking member is disposed between the principal surface of the metal foil and the electrode so as to cover a partial region of the principal surface. The masking member is an electric conductor. The masking member is electrically connected with the metal foil.

16 Claims, 4 Drawing Sheets

(51) Int. Cl.
      *H01G 13/00* (2013.01)
      *H01G 9/00* (2006.01)
      *H01G 9/042* (2006.01)
      *H01G 9/055* (2006.01)
      *H01G 9/15* (2006.01)

(52) U.S. Cl.
      CPC ............... *H01G 9/055* (2013.01); *H01G 9/15* (2013.01); *H01G 13/00* (2013.01)

(56) References Cited

U.S. PATENT DOCUMENTS

2012/0171507 A1* 7/2012 Hung ................... C25F 3/14
                                                                                                                           428/600
2015/0096790 A1 4/2015 Uzoh et al.

OTHER PUBLICATIONS

International Search Report of PCT application No. PCT/JP2016/004722 dated Dec. 20, 2016.
English Translation of Chinese Search Report dated Sep. 30, 2019 for the related Chinese Patent Application No. 201680068470.9.

* cited by examiner

ELECTRODE FOIL PRODUCTION METHOD AND CAPACITOR PRODUCTION METHOD

RELATED APPLICATIONS

This application is a continuation of the PCT International Application No. PCT/JP2016/004722 filed on Oct. 27, 2016, which claims the benefit of foreign priority of Japanese patent application No. 2015-234228 filed on Nov. 30, 2015, the contents all of which are incorporated herein by reference.

BACKGROUND

1. Technical Field

The present disclosure relates to an electrode foil production method and a capacitor production method.

2. Description of the Related Art

A metal foil containing a valve metal is used as an anode body of a capacitor element. All or part of a principal surface of the metal foil is etched in order to increase capacitance of the capacitor element. For example, Japanese Patent No. 5333582 discloses that a resin coat as a masking member is formed on part of a principal surface of a metal foil and part of a surface of an electrolytic etching electrode, and etching is performed on part of the principal surface of the metal foil in which the resin coat is not formed.

SUMMARY

A method for producing an electrode foil according to the present disclosure includes an electrolytic etching step of etching a metal foil containing first metal by applying current between the metal foil and an electrode in etching liquid while at least one principal surface of the metal foil faces the electrode. A masking member is disposed between the principal surface of the metal foil and the electrode so as to cover a partial region of the principal surface. The masking member is an electric conductor. The masking member is electrically connected with the metal foil.

According to the present disclosure, excessive etching is prevented near a boundary between a region covered by the masking member and a region not covered by the masking member. Thus, decreasing strength of the metal foil can be suppressed. Accordingly, an electrode foil achieves improved reliability.

DETAILED DESCRIPTION OF EMBODIMENT

Prior to describing an exemplary embodiment of the present disclosure, a problem found in conventional techniques will be briefly described.

In the technique disclosed in Japanese Patent No. 5333582, a masking member is made of resin and thus has extremely high electric resistance as compared to a metal foil. Thus, when electrolytic etching is performed, current concentrates near a boundary with the masking member in a metal foil. This current concentration leads to deep etching near the boundary.

Figure 7:
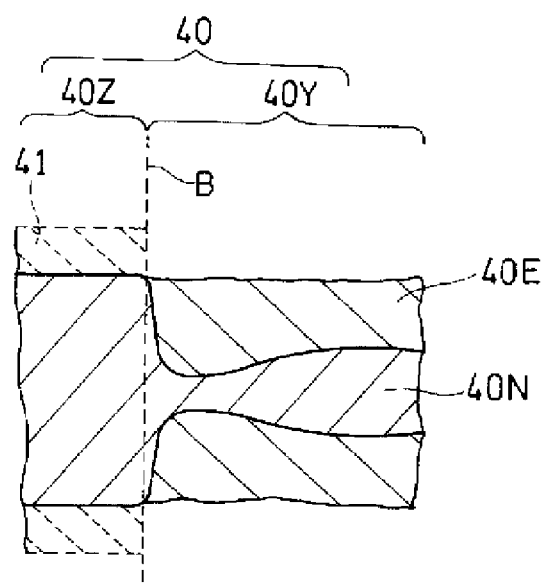
FIG. 7 is a cross-sectional view schematically illustrating part of a metal foil etched through a conventional electrolytic etching step.

FIG. 7 is a cross-sectional view of metal foil 40 provided with electrolytic etching by a conventional method using masking member 41 made of resin. As illustrated in FIG. 7, metal foil 40 has region 40Z masked by masking member 41 made of resin and region 40Y not covered by masking member 41. Region 40Y has two etched parts 40E respectively formed on principal surfaces of region 40Y, and non-etched part 40N sandwiched between etched parts 40E. Etched parts 40E have large etching depths in a thickness direction near boundary B between region 40Z and region 40Y due to the above-described current concentration. In other words, non-etched part 40N has small thickness near boundary B, in particular. Thus, metal foil 40 has small mechanical strength near boundary B. As a result, reliability of etched metal foil 40 (electrode foil) is likely to decrease.

A method for producing an electrode foil according to the present disclosure includes an electrolytic etching step of etching a metal foil containing first metal by applying current between the metal foil and an electrode in etching liquid while the electrode faces at least one principal surface of the metal foil. In the electrolytic etching step, a masking member is disposed between the principal surface of the metal foil and the electrode so as to cover a partial region of the principal surface. Accordingly, a region of the principal surface, which is not covered by the masking member, is etched.

In the present disclosure, the masking member is an electric conductor and electrically connected with the metal foil in the electrolytic etching step. In this disclosure, the phrase "the masking member is electrically connected with the metal foil" refers to a state in which electrons can move between the masking member and the metal foil. The electrical connection between the masking member and the metal foil reduces current concentration near a boundary of the metal foil with the masking member. The reduction of the current concentration leads to reduction of excessive etching near the boundary.

Accordingly, an electrode foil achieves improved reliability.

In case of using a masking member made of an insulation material, it is necessary not to provide a space between the masking member and the electrode in the electrolytic etching step. In other words, electrolytic etching needs to be performed while the masking member and the electrode are in close contact with each other. Thus, a distance between the masking member and the electrode needs to be controlled before and after the electrolytic etching step or during the electrolytic etching step. Thus, when the masking member is disposed in close contact with the metal foil, the degree of freedom in a method for conveying the metal foil decreases.

When the metal foil is etched, gas is generated from an etched place in some cases. In order to discharge the generated gas, an interval between the electrode and the metal foil is needed. Thus, if the masking member is disposed in close contact with the metal foil, a thickness of the masking member needs to be increased so as to provide the interval.

Conventionally, a mask is provided at a position on the electrode, which corresponds to a position of the masking member. This configuration eliminates the need for close contact between the masking member and the electrode, and thus the method for conveying the metal foil is not restricted. The configuration also makes it easy to provide a predetermined interval between the metal foil and the electrode. However, positioning is needed between the masking member and the mask provided to the electrode, which complicates work.

According to the present disclosure, the masking member is an electric conductor, and thus no mask needs to be provided to the electrode. Accordingly, etching can be performed in a practically useful manner without performing complicated work such as positioning. In addition, electrolytic etching can be performed while the masking member and the electrode are separated from each other, which increases the degree of freedom in the method for conveying the metal foil.

Figure 1:
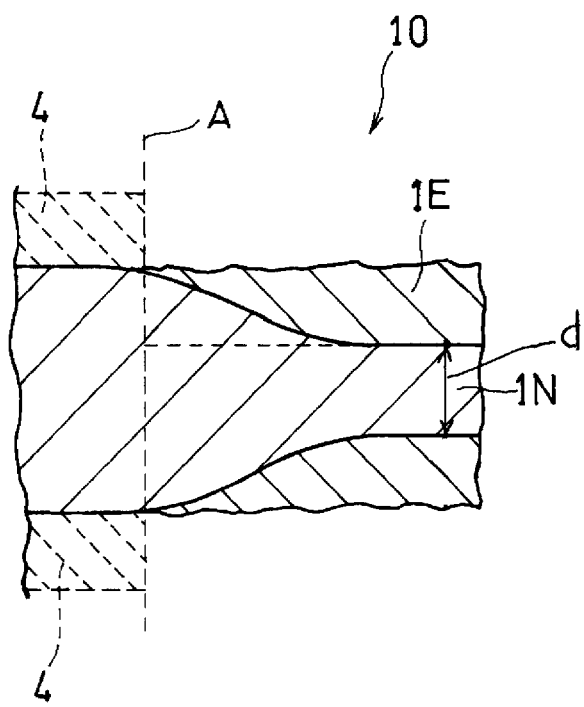
FIG. 1 is a cross-sectional view schematically illustrating part of an electrode foil etched through an electrolytic etching step according to an exemplary embodiment of the present disclosure.

FIG. 1 schematically illustrates part of a section of electrode foil 10 provided with electrolytic etching in the present embodiment. As illustrated in FIG. 1, obtained electrode foil 10 includes etched part 1E that is formed to be gradually deeper in the thickness direction at a position further away from vicinity of a boundary A between a region covered by masking member 4 and a region not covered by masking member 4. This configuration suppresses decrease of mechanical strength of electrode foil 10 near boundary A of electrode foil 10. In this case, thickness d of non-etched part 1N in first region 10E is preferably 2 µm or more in terms of strength.

Figure 2:
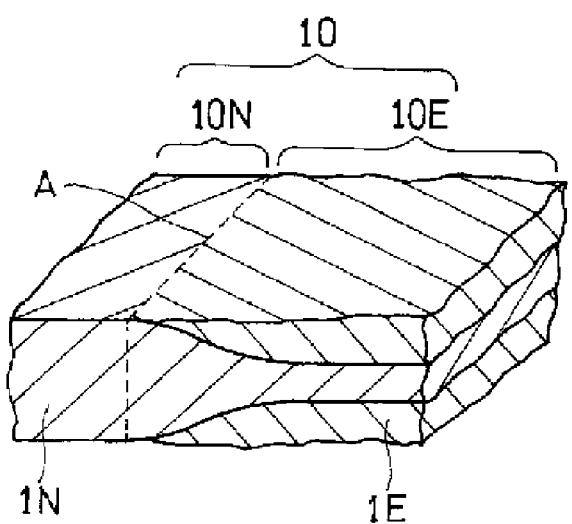
FIG. 2 is a perspective view schematically illustrating part of the electrode foil etched through the electrolytic etching step according to the exemplary embodiment of the present disclosure.

As illustrated in FIG. 2, electrode foil 10 formed by the electrolytic etching step includes first region 10E having an etched surface, and second region 10N having a non-etched surface. First region 10E includes etched parts 1E on surfaces, and includes non-etched part 1N inside. First region 10E and second region 10N are divided from each other at a position near boundary A. FIG. 2 is a perspective view schematically illustrating part of electrode foil 10 etched through the electrolytic etching step.

Metal foil 1 contains the first metal. Examples of the first metal include a valve metal such as titanium, tantalum, aluminum, and niobium. Metal foil 1 may contain one, or two or more of the valve metals. Metal foil 1 may contain the first metal in an alloy or intermetallic compound. A thickness of metal foil 1 is not particularly limited. The thickness of metal foil 1 ranges from 15 µm to 300 µm, inclusive, for example.

Masking member 4 is an electric conductor and contains an electric conductive material. The electric conductive material is not particularly limited, and examples of the electric conductive material include the above-described valve metals, metals such as silver, copper, iron, tin, lead, zinc, silica, nickel, gold, platinum, palladium, zirconium, tungsten, cobalt, and molybdenum, carbon materials such as graphite and carbon black, and conductive polymers. Masking member 4 may contain one, or two or more of the above-described electric conductive materials. Masking member 4 may contain the above-described metals in alloys or intermetallic compounds.

During the electrolytic etching step, the masking member and the metal foil are electrically connected with each other. In terms of improving an efficiency of etching metal foil 1 and suppressing the above-described current concentration, it is preferable that a resistance value of masking member 4 in the thickness direction (electric resistivity of the masking member×the thickness of the masking member) is substantially equal to, for example, a resistance value of metal foil 1 in the thickness direction. In terms of making it easier to achieve such adjustment that the resistance value of masking member 4 is equal to the resistance value of metal foil 1 and to achieve physical connection with metal foil 1 as described later, masking member 4 may contain metal (second metal). The second metal contained in masking member 4 is not particularly limited, but may be the same as the first metal contained in metal foil 1 or may be a different metal element. Since masking member 4 is an electric conductor, a surface of masking member 4, which faces the electrode, is also etched.

A method for covering part of a principal surface of metal foil 1 with masking member 4 is not particularly limited. For example, part of the principal surface of metal foil 1 may be coated with a material of masking member 4, which is resin (conductive ink) containing an electric conductive material. In this case, masking member 4 and metal foil 1 are electrically and physically connected with each other. In terms of productivity, masking member 4 may be shaped in a sheet containing an electric conductive material. In this case, masking member 4 shaped in a sheet may be disposed so as to cover part of the principal surface of metal foil 1. Examples of masking member 4 shaped in a sheet include a metal foil containing the second metal, and a conductive tape shaped by using resin containing an electric conductive material. The conductive tape may be adhesive. Masking member 4 is preferably the metal foil (a foil of second metal).

When resin containing an electric conductive material is used as the material of masking member 4, thermosetting resin or thermoplastic resin may be used as the resin. Examples of the thermosetting resin include urethane resin, phenolic resin, epoxy resin, silicone resin, and polyimide. Examples of the thermoplastic resin include acrylic resin and polyester. Such resin containing an electric conductive material has an electric resistivity ranging from $3.0 \times 10^{-6}$ Ω/cm to $1.0 \times 10^3$ Ω/cm, inclusive, for example.

The thickness of masking member 4 may be set as appropriate by taking into account a distance between the electrode and masking member 4.

The thickness of masking member 4 is preferably adjusted so that the resistance value of masking member 4, which is calculated from a product of the electric resistivity of masking member 4 and the thickness of masking member 4, is substantially equal to the resistance value of metal foil 1. The thickness of masking member 4 ranges from 15 µm to 300 µm, inclusive, for example. When electrolytic etching is provided on masking member 4 together with metal foil 1 in the electrolytic etching step, the masking member preferably has such a thickness that, for example, masking member 4 remains during the electrolytic etching step.

When masking member 4 is shaped in a sheet, masking member 4 and metal foil 1 may be or may not be physically connected with each other. In particular, masking member 4 and metal foil 1 are preferably physically connected with each other. This is because positional shift of masking member 4 can be prevented in the electrolytic etching step.

When masking member 4 and metal foil 1 are physically connected with each other, adhesion between metal foil 1 and masking member 4 is expected to improve as compared to a case in which masking member 4 and metal foil 1 are simply in contact with each other. When the adhesion between metal foil 1 and masking member 4 improves, etching liquid is prevented from entering into between metal foil 1 and masking member 4. By preventing the ingress of the etching liquid, displacement of a boundary between first region 10E and second region 10N toward second region 10N from above-described boundary A is suppressed. If the boundary between first region 10E and second region 10N is displaced from boundary A toward second region 10N, crawl of a solid electrolyte layer, which is to be described later, toward second region 10N from an assumed position when the solid electrolyte layer is formed on a surface of electrode foil 10.

When masking member 4 is a foil of the second metal, masking member 4 is preferably physically connected with metal foil 1 by welding. In this case, a connection part between masking member 4 and metal foil 1 has a small resistance value, and thus the current concentration is likely to be further reduced. In addition, physical and electrical connection can be simultaneously achieved between metal foil 1 and masking member 4 by welding masking member 4 to metal foil 1. This improves operability in production of electrode foil 10. When masking member 4 is an adhesive conductive tape, masking member 4 can be physically connected with metal foil 1 through adhesion to a predetermined position on metal foil 1. Alternatively, metal foil 1 and masking member 4 may be physically connected with each other by cold welding or swaging.

When the electrolytic etching step is performed while masking member 4 and metal foil 1 are not physically connected with each other, masking member 4 may be disposed in advance at such a position that masking member 4 can cover a partial region of metal foil 1 between electrode 2 and metal foil 1. In this case, metal foil 1 and masking member 4 are electrically connected with each other through another conductive member in the electrolytic etching step.

(Electrolytic Etching Step)

Figure 3:
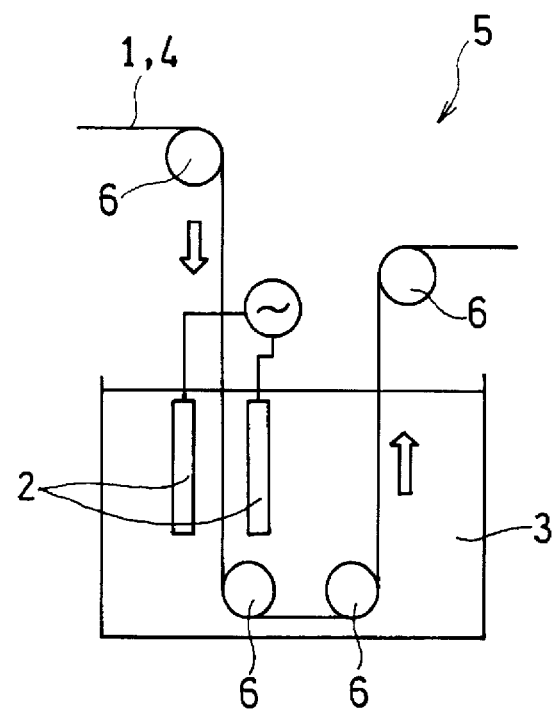
FIG. 3 is an explanatory diagram schematically illustrating an electrolytic etching device used in the electrolytic etching step according to the exemplary embodiment of the present disclosure.
Figure 4:
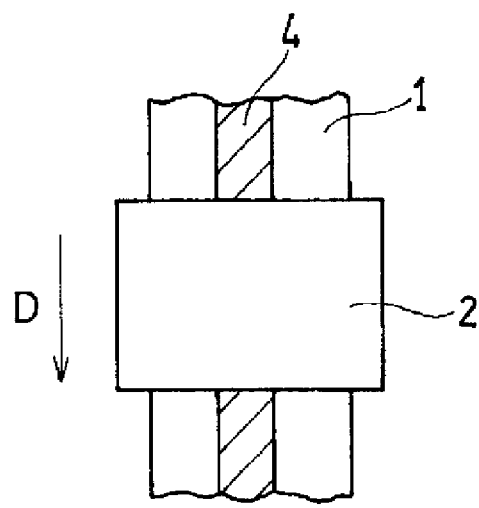
FIG. 4 is a schematic diagram illustrating a positional relation among a metal foil, a masking member, and an electrode in the electrolytic etching step according to the exemplary embodiment of the present disclosure.

The electrolytic etching step according to the present embodiment will be described with reference to FIGS. 3 and 4. FIG. 3 is an explanatory diagram schematically illustrating electrolytic etching device 5 used in the electrolytic etching step according to the present embodiment. FIG. 4 is a schematic diagram illustrating a positional relation among metal foil 1, masking member 4, and electrode 2 in the electrolytic etching step according to the present embodiment. For sake of convenience, masking member 4 is hatched in FIG. 4.

The electrolytic etching step is performed by, for example, a device illustrated in FIG. 3. FIG. 3 illustrates a case in which electrolytic etching is performed on long metal foil 1 conveyed through a plurality of rolls 6, but the present disclosure is not limited to this configuration. For example, a batch scheme may be applied in which the electrolytic etching step is performed on a metal foil having a certain area and being placed still.

The electrolytic etching step is performed by applying current between metal foil 1 and electrode 2 in etching liquid 3 while at least one principal surface of metal foil 1 faces electrode 2. In FIG. 3, masking member 4 is already disposed at a predetermined position on metal foil 1 being conveyed. In this case, masking member 4 is disposed in a strip shape along longitudinal direction D of metal foil 1 as illustrated in, for example, FIG. 4.

The current flowing between metal foil 1 and electrode 2 may be alternating current as illustrated in FIG. 3 or may be direct current. Electrolytic etching may be performed on both principal surfaces of metal foil 1 or may be performed only on one of the principal surfaces. When electrolytic etching is performed on both principal surfaces of metal foil 1, masking member 4 may be disposed between each of principal surfaces of metal foil 1 and corresponding one of two electrodes 2 disposed facing the respective principal surfaces. In this case, as illustrated in FIGS. 1 and 2, in first region 10E, etched parts 1E are formed on both principal surfaces, and non-etched part 1N is formed between etched parts 1E. Accordingly, etched part 1E, non-etched part 1N, and etched part 1E are disposed in this order in the thickness direction of first region 10E.

Etching liquid 3 may be well-known etching liquid used in electrolytic etching. Etching liquid 3 is, for example, water solution containing hydrochloric acid in addition to sulfuric acid, nitric acid, phosphoric acid, and/or oxalic acid. The water solution may contain various additives such as chelating agent. Concentration of hydrochloric acid in etching liquid 3, and concentration and temperature of any other acid in etching liquid 3 are not particularly limited, but may be set as appropriate in accordance with a shape of a desired etching pit and performance of a capacitor. The concentration of hydrochloric acid relative to etching liquid 3 ranges from 1 mol/L to 10 mol/L, inclusive, for example, and the concentration of any other acid ranges from 0.01 mol/L to 1 mol/L, inclusive, for example. Temperature of etching liquid 3 during the electrolytic etching step ranges from 15° C. to 60° C., inclusive, for example.

When an alternating-current power source is used, current waveform and frequency are not particularly limited. The frequency of the alternating-current power source ranges from 1 Hz to 500 Hz, inclusive, for example. Density of the current flowing between electrode foil 1 and electrode 2 is not particularly limited, but ranges from 0.01 A/cm$^2$ to 10 A/cm$^2$, inclusive, for example.

Although the present embodiment describes the method for performing the electrolytic etching step by using the pair of electrodes 2, but the present disclosure is not limited to this configuration. For example, electrolytic etching may be performed while one electrode 2 and metal foil 1 are disposed facing each other and connected with a power source.

<Capacitor Element>

A capacitor element including electrode foil 10 as an anode body is produced as described below, for example. Specifically, the capacitor element is produced by a method including a first step of preparing electrode foil 10 produced by a method including the electrolytic etching step described above, and a second step of forming a dielectric layer on the surface of electrode foil 10 in first region 10E and then causing the dielectric layer to contact with electrolyte.

Figure 5:
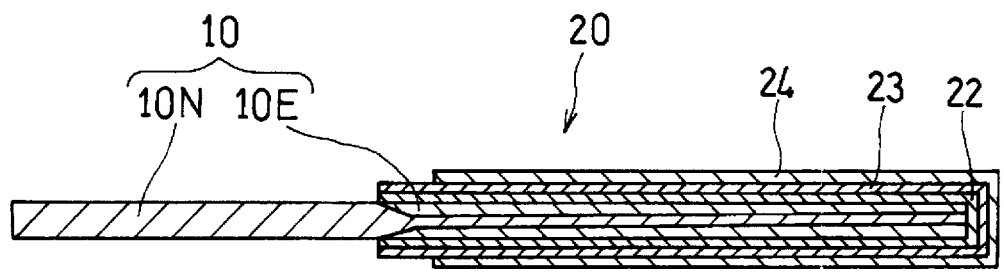
FIG. 5 is a cross-sectional view schematically illustrating a capacitor element included in a capacitor according to the exemplary embodiment of the present disclosure.

FIG. 5 illustrates a cross-sectional view schematically illustrating capacitor element 20 according to the exemplary embodiment. In FIG. 5, dielectric layer 22 and solid electrolyte layer 23 are sequentially formed in first region 10E of electrode foil 10. Solid electrolyte layer 23 is further covered by cathode extension layer 24. Cathode extension layer 24 is used for connection with a cathode terminal (not illustrated). Masking member 4 is preferably removed before dielectric layer 22 is formed.

(First Step)

In the first step, electrode foil 10 is prepared. Electrode foil 10 is produced by a method including the above-described electrolytic etching step. A removal step of removing masking member 4 used in the above-described electrolytic etching step is preferably included between the first step and the second step. When the removal step is performed before the second step, masking member 4 can be removed without damage on dielectric layer 22 and solid electrolyte layer 23 formed in the second step.

(Second Step)

In the second step, first, dielectric layer 22 is formed on the surface of first region 10E.

Dielectric layer 22 is formed by anodizing the surface of first region 10E through, for example, anodizing treatment. The anodization may be formed by a well-known method. A method for forming dielectric layer 22 is not limited to the anodization, but any method for forming an insulating layer that functions as a dielectric on the surface of first region 10E is applicable.

Then, solid electrolyte layer 23, as an example of electrolyte, is formed to cover dielectric layer 22. Solid electrolyte layer 23 contains, for example, manganese compound and conductive polymer. Examples of the conductive polymer include polypyrrole, polythiophene, polyaniline, and their derivatives.

Solid electrolyte layer 23 containing a conductive polymer can be formed through, for example, chemical polymerization and/or electrolytic polymerization of raw material monomer on dielectric layer 22. Alternatively, solid electrolyte layer 23 can be formed by applying, onto dielectric layer 22, solution in which conductive polymer is dissolved or dispersion liquid in which conductive polymer is dispersed.

Subsequently, cathode extension layer 24 is formed on a surface of solid electrolyte layer 23. Cathode extension layer 24 includes, for example, a carbon layer, and a metal (for example, silver) paste layer formed on a surface of the carbon layer (both layers not illustrated). Such cathode extension layer 24 is formed by sequentially applying carbon paste and silver paste.

The carbon layer is formed to cover at least part of solid electrolyte layer 23. The carbon layer is made of a composition containing conductive carbon material such as graphite. The metal paste layer is made of, for example, a composition containing silver particles and resin. Cathode extension layer 24 is not limited to this configuration. Cathode extension layer 24 only needs to have a power collection function.

After the second step, electrode foil 10 produced through the first step and the second step as described above is cut into a desired shape including first region 10E and second region 10N. Accordingly, the electrode foil serving as the anode body of capacitor element 20 is obtained.

<Capacitor>

Figure 6:
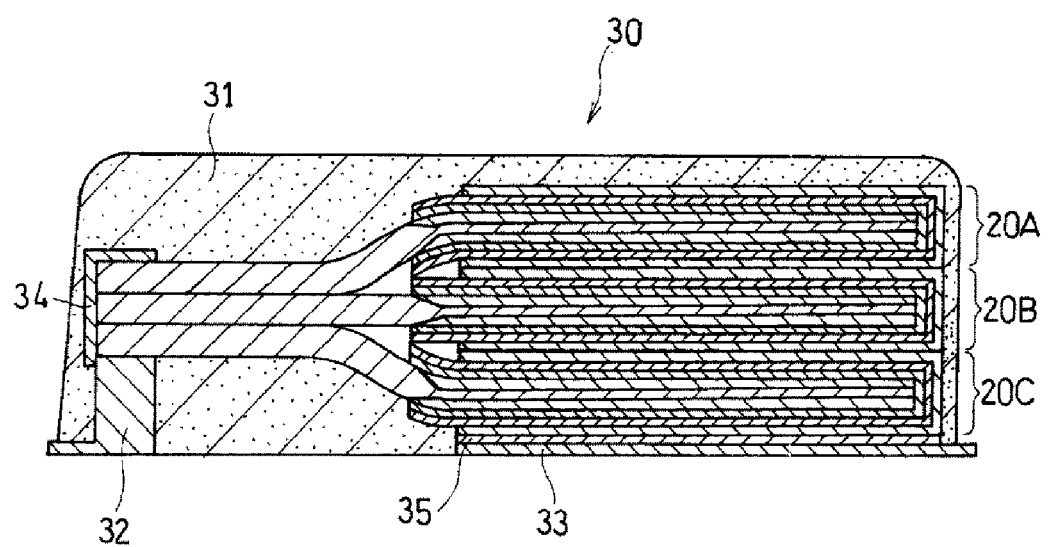
FIG. 6 is a cross-sectional view schematically illustrating the capacitor according to the exemplary embodiment of the present disclosure.

FIG. 6 is a cross-sectional view schematically illustrating capacitor 30 including a plurality of capacitor elements 20A to 20C. As illustrated in FIG. 6, capacitor elements 20 are stacked and disposed in capacitor 30.

A configuration of capacitor 30 according to the present disclosure will be described below in detail. Although capacitor 30 according to the present embodiment includes three capacitor elements 20, a number of included capacitor elements 20 is not limited. Capacitor 30 includes at least one capacitor element 20.

Capacitor 30 includes stacked capacitor elements 20A to 20C, exterior body 31 that seals capacitor elements 20A to 20C, anode terminal 32 electrically connected with electrode foil 10, and cathode terminal 33 electrically connected with cathode extension layer 24. Such capacitor 30 is produced by joining anode terminal 32 and cathode terminal 33 to predetermined positions, respectively, on one of capacitor elements 20 and sealing the stack of capacitor elements 20A to 20C in exterior body 31.

Capacitor elements 20 are joined together by integrally swaging, for example, second regions 10N (not illustrated) through swage member 34, and electrically connected with each other. A method for joining capacitor elements 20 is not limited to the above-described method, but capacitor elements 20 may be joined together by laser welding or resistance welding.

(Exterior Body)

Exterior body 31 is formed of, for example, insulating resin. Examples of the insulating resin include epoxy resin, phenolic resin, silicone resin, melamine resin, urea resin, alkyd resin, polyurethane, polyimide, polyamide-imide, and unsaturated polyester.

(Anode Terminal)

Anode terminal 32 is joined with second region 10N and electrically connected with electrode foil 10. A material of anode terminal 32 is not particularly limited as long as it is an electric conductive material. Anode terminal 32 may be joined with second region 10N through conductive adhesive agent or soldering, or may be joined with second region 10N by resistance welding or laser welding. The conductive adhesive agent is, for example, a composite of any of the above-described insulating materials with carbon particles or metal particles.

(Cathode Terminal)

Cathode terminal 33 is electrically connected with cathode extension layer 24. A material of cathode terminal 33 is not particularly limited as long as it is an electric conductive material. Cathode terminal 33 is joined with cathode extension layer 24 through, for example, the above-described conductive adhesive agent 35.

Although the present embodiment describes a capacitor including solid electrolyte and housing each capacitor element in exterior resin, the present disclosure is not limited to this configuration. For example, the electrode foil according to the present disclosure is applicable to at least one of strip-shaped electrode foils included in an anode and a cathode of a capacitor element of a capacitor. In the capacitor, the capacitor element is housed in a bottomed tubular case. The capacitor element includes the anode and the cathode, a separator interposed between the anode and the cathode, and electrolytic solution impregnated as electrolyte in the separator.

An electrode foil produced by the method according to the present disclosure has high reliability, and thus is applicable to capacitors in various usages.

What is claimed is:

1. A method for producing an electrode foil a capacitor, the method comprising:
   a first step of preparing the electrode foil produced by etching a part of a metal foil containing first metal by applying current between the metal foil and an electrode in etching liquid while a principal surface of the metal foil faces the electrode; and
   a second step of forming a dielectric layer on the principal surface of the electrode foil, the principal surface being etched, and then causing the dielectric layer to contact with electrolyte, wherein:

in the first step, a masking member is disposed between the principal surface of the metal foil and the electrode so as to cover a partial region of the principal surface, the masking member is an electric conductor, and the masking member is electrically connected with the metal foil.

2. The method for producing the capacitor according to claim 1, wherein the electric conductor contains second metal.

3. The method for producing the capacitor according to claim 1, wherein the electric conductor has a sheet shape.

4. The method for producing the capacitor according to claim 3, wherein the electric conductor is electrically connected with the metal foil by welding at least part of the electric conductor to the metal foil.

5. The method for producing the capacitor according to claim 1, wherein the electric conductor is electrically connected with the metal foil by bonding the electric conductor to the metal foil.

6. The method for producing the capacitor according to claim 1, wherein the electric conductor is electrically connected with the metal foil by applying the electric conductor to the metal foil.

7. The method for producing the capacitor according to claim 1, further comprising a step of removing the masking member after the first step.

8. The method for producing the capacitor according to claim 1, wherein a surface of the masking member, which faces the electrode, is etched in the first step.

9. A method for producing an electrode foil, the method comprising an electrolytic etching step of etching a metal foil containing first metal by applying current between the metal foil and an electrode in etching liquid while a principal surface of the metal foil faces the electrode, wherein:

a masking member is disposed between the principal surface of the metal foil and the electrode so as to cover a partial region of the principal surface, the masking member is an electric conductor, the masking member is electrically connected with the metal foil, and the electrode foil is disposed in a capacitor that includes a dielectric layer covering at least part of the electrode foil and electrolyte in contact with at least part of the dielectric layer.

10. The method for producing the electrode foil according to claim 9, wherein the electric conductor contains second metal.

11. The method for producing the electrode foil according to claim 9, wherein the electric conductor has a sheet shape.

12. The method for producing the electrode foil according to claim 11, wherein the electric conductor is electrically connected with the metal foil by welding at least part of the electric conductor to the metal foil.

13. The method for producing the electrode foil according to claim 9, wherein the electric conductor is electrically connected with the metal foil by bonding the electric conductor to the metal foil.

14. The method for producing the electrode foil according to claim 9, wherein the electric conductor is electrically connected with the metal foil by applying the electric conductor to the metal foil.

15. The method for producing the electrode foil according to claim 9, further comprising a step of removing the masking member after the electrolytic etching step.

16. The method for producing the electrode foil according to claim 9, wherein a surface of the masking member, which faces the electrode, is etched in the electrolytic etching step.

* * * * *

UNITED STATES PATENT AND TRADEMARK OFFICE
CERTIFICATE OF CORRECTION

PATENT NO. : 10,655,241 B2
APPLICATION NO. : 15/980132
DATED : May 19, 2020
INVENTOR(S) : Kyohei Kobayashi et al.

Page 1 of 1

It is certified that error appears in the above-identified patent and that said Letters Patent is hereby corrected as shown below:

In the Claims

At Column 8, Claim number 1, Line 57: please delete "an electrode foil.".

At Column 8, Claim number 1, Line 59: please replace "the" with -- an --.

Signed and Sealed this
Twenty-eighth Day of July, 2020

Andrei Iancu
*Director of the United States Patent and Trademark Office*